(12) United States Patent
Juni

(10) Patent No.: US 9,706,195 B2
(45) Date of Patent: Jul. 11, 2017

(54) DISPLAY DEVICE

(71) Applicant: NITTO DENKO CORPORATION, Ibaraki-shi, Osaka (JP)

(72) Inventor: Noriyuki Juni, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 0 days.

(21) Appl. No.: 15/120,431

(22) PCT Filed: Apr. 13, 2015

(86) PCT No.: PCT/JP2015/061330
§ 371 (c)(1),
(2) Date: Aug. 19, 2016

(87) PCT Pub. No.: WO2015/182265
PCT Pub. Date: Dec. 3, 2015

(65) Prior Publication Data
US 2017/0013256 A1    Jan. 12, 2017

(30) Foreign Application Priority Data
May 29, 2014    (JP) ................................ 2014-111145

(51) Int. Cl.
*H04N 13/04*    (2006.01)
*G02B 27/22*    (2006.01)
(Continued)

(52) U.S. Cl.
CPC ....... *H04N 13/0488* (2013.01); *G02B 5/1814* (2013.01); *G02B 27/021* (2013.01);
(Continued)

(58) Field of Classification Search
CPC .... H04N 13/0018; H04N 13/02; H04N 13/04; H04N 13/0488; H04N 13/0497;
(Continued)

(56) References Cited

U.S. PATENT DOCUMENTS

2008/0218515 A1* 9/2008 Fukushima ........ H04N 13/0404
345/424
2010/0066662 A1* 3/2010 Tomisawa .............. G03B 37/04
345/156
(Continued)

FOREIGN PATENT DOCUMENTS

CN        101287141 A    10/2008
JP        2003-98479 A    4/2003
(Continued)

OTHER PUBLICATIONS

International Search Report dated Jul. 7, 2015, issued in counterpart International Application No. PCT/JP2015/061330 (2 pages).
(Continued)

*Primary Examiner* — Behrooz Senfi
*Assistant Examiner* — Maria Vazquez Colon
(74) *Attorney, Agent, or Firm* — Westerman, Hattori, Daniels & Adrian, LLP

(57) ABSTRACT

A display device includes: an image-forming optical element provided in light-transmissive fashion in an upper surface of an enclosure; a display dispose in an attitude inclined at a predetermined inclination angle with respect to a lower surface of the image-forming optical element; a reader for reading information held by an information holding element in a non-contacting manner; a sensor for sensing whether an object is present on the upper surface of the enclosure or not; and a controller which controls display on the display. The controller prepares an image corresponding to the information holding element, based on the information held therein and transmitted from the reader. The controller causes the prepared image to be displayed as a spatial image at an appropriate moment, based on an object detection signal transmitted from the sensor.

4 Claims, 5 Drawing Sheets

(51) Int. Cl.
*H04N 13/00* (2006.01)
*H04N 13/02* (2006.01)
*G02B 5/18* (2006.01)
*G02B 27/02* (2006.01)
*G02B 5/122* (2006.01)

(52) U.S. Cl.
CPC ......... *G02B 27/026* (2013.01); *G02B 27/028* (2013.01); *G02B 27/2292* (2013.01); *H04N 13/0018* (2013.01); *H04N 13/02* (2013.01); *H04N 13/04* (2013.01); *H04N 13/0497* (2013.01); *G02B 5/122* (2013.01); *G02B 2005/1804* (2013.01)

(58) Field of Classification Search
CPC .. G02B 27/021; G02B 27/026; G02B 27/028; G02B 27/2292; G02B 5/1814; G02B 5/122; G02B 2005/1804
See application file for complete search history.

(56) References Cited

U.S. PATENT DOCUMENTS

2014/0240228 A1* 8/2014 Juni ................ G06F 3/0304
                                                          345/156
2015/0124222 A1   5/2015 Juni

FOREIGN PATENT DOCUMENTS

| JP | 2012-78571 A | 4/2012 |
|----|---|---|
| JP | 2013-228671 A | 11/2013 |
| JP | 2014-10161 A | 1/2014 |
| JP | 2014-21305 A | 2/2014 |
| JP | 2014-32600 A | 2/2014 |
| JP | 2014-126683 A | 7/2014 |
| TW | 201346470 A | 11/2013 |

OTHER PUBLICATIONS

Decision to Grant a Patent dated May 31, 2016, issued in counterpart Japanese Patent Application No. 2014-111145, w/English machine translation (6 pages).

Office Action dated Jan. 16, 2017, issued in counterpart Chinese Patent Application No. 201580008870.6, with English translation. (11 pages).

Notification of Transmittal of Translation of the International Preliminary Report on Patentability (Form PCT/IB/338) issued in counterpart International Application No. PCT/JP2015/061330 mailed Dec. 8, 2016 with Forms PCT/IB/373 and PCT/ISA/237. (6 pages).

* cited by examiner

DISPLAY DEVICE

TECHNICAL FIELD

The present invention relates to a display device capable of recognizing an object (information holding element) placed on an upper surface of an enclosure for housing a display to project a two-dimensional video picture appearing three-dimensional and corresponding to this information holding element in space over the device.

BACKGROUND ART

Heretofore, there has been known an image display device which includes: an image display surface (liquid crystal display panel and the like) for displaying an image including a three-dimensional image; and an image transmission panel (image-forming optical element) provided on the near side (viewer side) of the image display surface in spaced apart relation to the display surface and for forming the aforementioned image in space (see PTL 1, for example).

On the other hand, the present applicant has already proposed a display device in JP-A-2014-115606, PTL 2 and the like. This display device includes a case for housing a display, a mounting stand for placing thereon the display inclined at a predetermined inclination angle, and a panel-shaped image-forming optical element, wherein a projected image of a video picture displayed on the display is image-formed in a manner floating up over the image-forming optical element by means of light projected from the display and transmitted through the image-forming optical element.

The present applicant has further proposed another display device in JP-A-2014-126682 and JP-A-2014-126683. In response to an information holding element (information input element with an IC tag, a bar code and the like) such as a card, a figure and the like placed on the upper surface of the display device, this display device is capable of effectively displaying a two-dimensional video picture appearing three-dimensional and corresponding to this information holding element over the device in real time.

As shown in FIG. 10, the display devices according to these proposals are configured such that identification information (IC tag T) held by a planar information holding element (information input element such as a card C) disposed around an image-forming optical element (micromirror array M) disposed on the upper surface of an enclosure is read by a recognition means (reader R) and transmitted from the recognition means to a controller of a display D. Thus, a video picture (image I) corresponding to the information holding element is displayed on the display D including a display surface Da in an attitude inclined at a predetermined inclination angle α with respect to the image-forming optical element, so that a projected image of the video picture is displayed through the image-forming optical element as a spatial image I' floating up in space over the enclosure. In FIG. 10, the reference character P designates an element surface of the micromirror array M, and Ma and Mb designate an upper surface and a lower surface, respectively, of the micromirror array M.

RELATED ART DOCUMENT

Patent Document

PTL 1: JP-A-2003-98479
PTL 2: JP-A-2013-228671

SUMMARY OF INVENTION

An apprehension about the use of the aforementioned display devices has been pointed out through monitoring tests and the like conducted on subjects. That is a problem such that the spatial image gives a feeling of strangeness to the subjects, and it is difficult for the subjects to obtain a sense of realism in some cases when the information holding element such as a card and a figure is placed on the upper surface of such a display device (case). As a result of the investigation into the cause of this phenomenon, the present inventor has found that, when there is a large time difference between the moment at which these information holding elements are placed on the upper surface and the moment at which the three-dimensional image (spatial image) floats up from the upper surface such as in the case where the spatial image is very slow in floating up after a game card is placed on the upper surface, a viewer does not feel surprise and realism at the spatial image but finds difficulty in empathizing (i.e., the viewer gets a strong "artificial-looking" impression from the spatial image to lose interest) in some cases. The aforementioned display devices still have room for improvement in this regard.

In view of the foregoing, it is therefore an object of the present invention to provide a display device capable of displaying a two-dimensional video picture corresponding to an information holding element disposed around an image-forming optical element and appearing three-dimensional over the device at an appropriate moment with a strong sense of realism.

To accomplish the aforementioned object, a display device according to the present invention comprises: an enclosure for housing a display; an image-forming optical element provided in light-transmissive fashion in an upper surface of the enclosure; a display disposed under the image-forming optical element and including a display surface inclined at a predetermined inclination angle with respect to a lower surface of the image-forming optical element; an information holding element for placement on the upper surface of the enclosure; a reader for reading information held by the information holding element in a non-contacting manner; a sensor for sensing whether an object is present on the upper surface of the enclosure or not; and a controller which causes a video picture to be displayed on the display and which controls the video picture, based on signals from the reader and the sensor, the controller performs switching between a standby state (A) and a display state (B), based on the information held by the information holding element and transmitted from the reader and an object detection signal transmitted from the sensor, wherein the standby state (A) is a state in which, when the information holding element enters a region in which signals are readable by the reader before the information holding element comes in abutment with the upper surface of the enclosure, the reader reads individual information held by the information holding element and the controller prepares a video picture corresponding to the information holding element, based on the individual information transmitted from the reader to the controller and, wherein the display state (B) is a state in which, while the information holding element is in abutment with the upper surface of the enclosure, the controller causes the prepared video picture to be displayed on the display, based on the object detection signal transmitted from the sensor to the controller, so that a projected image of the video picture is image-formed through the image-forming optical element in a manner floating up in space over the enclosure.

Specifically, the present inventor has made studies to solve the aforementioned problem. As a result, the present inventor has found that the video picture (still and moving pictures and the like) corresponding to the information holding element is effectively provided at a moment optimum for a viewer by separately providing the sensor for sensing the abutment of the information holding element (intimate contact with the upper surface) in addition to the reader for reading the identification (individual) information in the information holding element and by using the detection signals from the reader and the sensor in combination. Hence, the present inventor has attained the present invention.

The term "abutment" of the information holding element with the upper surface of the enclosure as used in the present invention shall include a state of "close proximity" in which a clearance is not greater than 2 mm between the upper surface and the holding element in addition to a state of "contact" in which the clearance is equal to 0 (zero). The expression "signals are readable by the reader" shall indicate a state in which steady communication is achieved within a distance of 10 cm between the reader and the information holding element (IC tag T) (in actuality, including a distance of 10 cm or more at which one-way communication is achieved), the state being pursuant to the "proximity type" described in ISO/IEC 10536 in relation to IC cards.

Using the signal information (information inherent in the information holding element) provided from the reader that reads information in a non-contacting manner and the signal information (detection signal of the information holding element) provided from the sensor that senses whether an object is present on the upper surface of the enclosure or not, the display device according to the present invention quickly performs switching between the standby state in which the individual information in the information holding element in proximity to the upper surface of the enclosure is read and the video picture corresponding to the information holding element is prepared and the display state in which the prepared video picture is image-formed through the image-forming optical element in space over the enclosure. Thus, the display device according to the present invention is capable of displaying a two-dimensional video picture corresponding to the information holding element and appearing three-dimensional over the device at an appropriate moment in a manner floating up. Therefore, the display device according to the present invention is capable of displaying an effective spatial image corresponding to the information holding element at an optimum moment with a strong sense of realism as if the spatial image existed there.

In the display device according to the present invention wherein the information holding element is planar and includes a light-transmissive part provided in a portion thereof and corresponding to the two-dimensional shape of the image-forming optical element, the projected image is image-formed through the light-transmissive part. Because of this configuration, the planar information holding element such as a card becomes a comparable object that causes parallax between the projected image (spatial image) and the upper surface of the image-forming optical element. This allows a viewer to easily visually recognize the spatial image and to feel the spatial image more clearly as a three-dimensional video picture with a stronger sense of realism. In addition, the display device having the aforementioned configuration is configured such that the spatial image floats up from the interior (light-transmissive part) of the planar information holding element at an appropriate moment at the same time that the planar information holding element such as a card is placed on the upper surface of the device. Because of these combined effects, the display device according to the present invention is capable of causing the spatial image corresponding to the planar information holding element to appear more impressive.

In particular, the display device according to the present invention wherein the inclination angle of the display surface of the display is in the range of 30 degrees to less than 90 degrees with respect to the lower surface of the image-forming optical element is capable of displaying the two-dimensional image displayed and appearing three-dimensional as an image appearing three-dimensional with a stronger sense of floating.

Examples of the "image-forming optical element" usable in the display device according to the present invention include refraction type image-forming elements (various lenses including Fresnel lenses and the like, micromirrors of afocal optical systems, and corner reflectors) which form a mirror image of a projected object as a real image. Preferred examples of these refraction type image-forming elements are panel-shaped or planar in outside shape, and have relatively even and flat front and back surfaces (upper and lower surfaces). The terms "upper surface" and "lower surface" of the aforementioned image-forming optical element refer to surfaces corresponding to the outside or surfaces corresponding to the inside of the enclosure such as the case, the housing and the like, and indicate surfaces substantially parallel to the "element surface" of the image-forming optical element serving as a reference for image formation (a point of refraction of an optical path).

DESCRIPTION OF EMBODIMENTS

Next, embodiments according to the present invention will now foe described in detail with reference to the drawings. It should be noted that the present invention is not limited to the embodiments.

Figure 1:
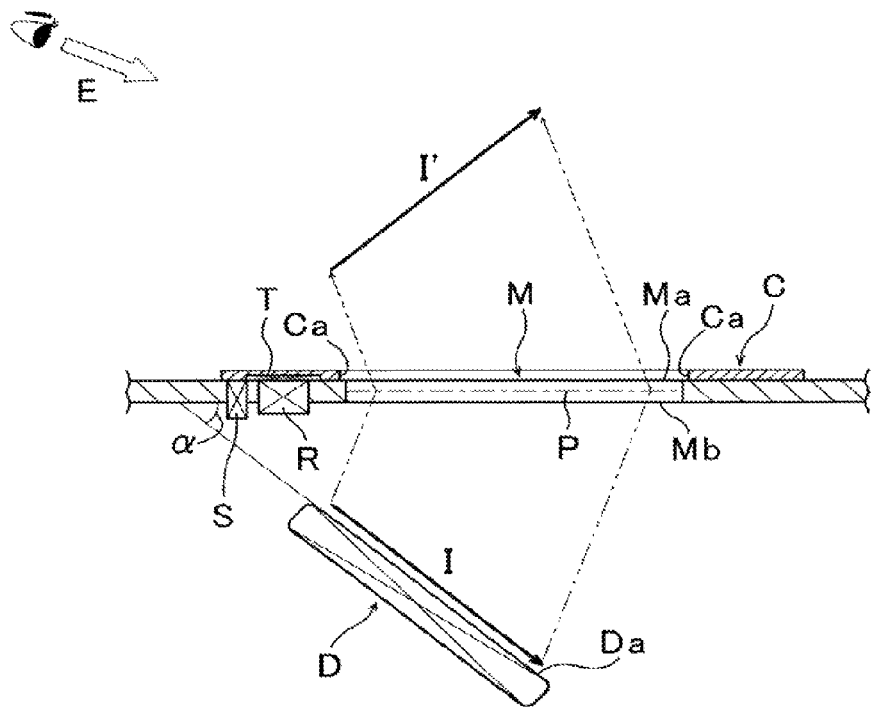
FIG. 1 is a partial sectional view illustrating a fundamental configuration of a display device according to embodiments of the present invention.
Figure 10:
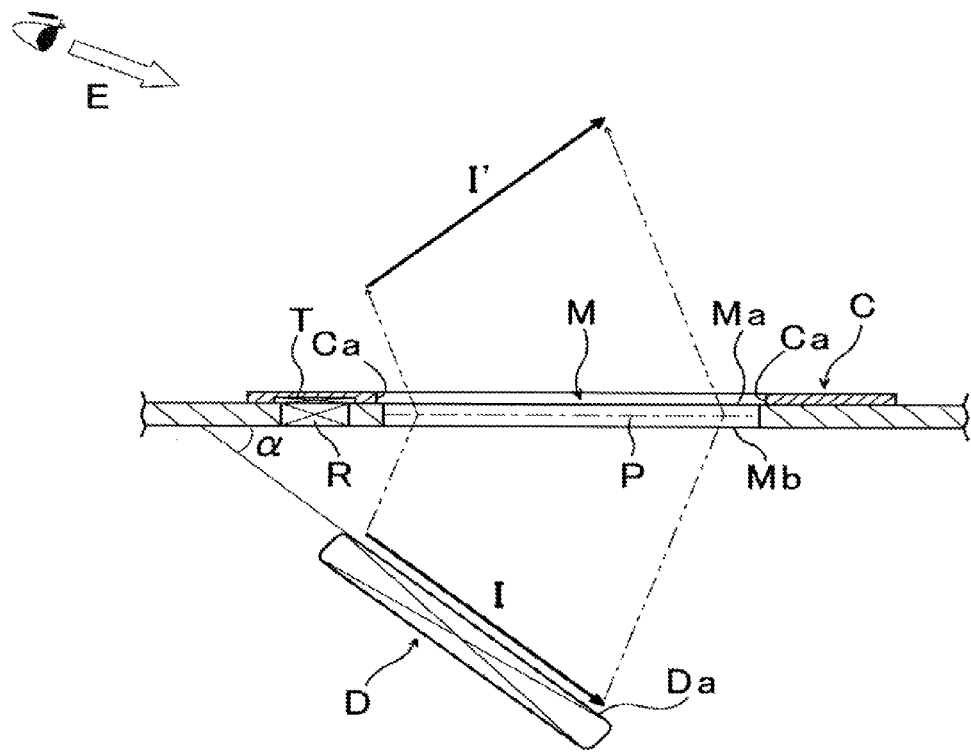
FIG. 10 is a partial sectional view illustrating the configuration of a conventional display device.

FIG. 1 is a view illustrating a fundamental configuration of a display device according to the present invention, and differs from the related art shown in FIG. 10 in including a sensor S. In FIG. 1, members such as a case and a housing, and components such as interconnect lines and electrical components are not shown for the purpose of briefly illustrating only the principle of the present invention. Also, the thickness of a planar information holding element (card C in the figure) that holds identification information therein is shown in exaggeration.

As shown in FIG. 1, the display device according to the present embodiment includes a panel-shaped micromirror array image-forming optical element (hereinafter referred to as a "micromirror array M"), a flat panel display (hereinafter referred to as a "display D"), and a controller (not shown) which controls a video picture (image I) displayed on the display D. By using the reflection of light from a large number of corner reflectors provided in the micromirror array M, the image I displayed on a display surface Da of the display D disposed in an attitude inclined at a predetermined inclination angle α on the lower surface Mb side of the micromirror array M is image-formed as a spatial image I' standing up obliquely in space on the upper surface Ma side of the micromirror array M in a manner floating up.

The display device has an upper surface serving as an information input surface (operation surface) for reading the identification information held by the information holding element (card C) placed thereon. A reader R for reading the identification (individual) information in the card C placed on the information input surface in a non-contacting manner, and the sensor S that senses whether an object is present or not for the purpose of detecting that the information holding element such as the card C is in abutment with the upper surface of the device are provided around the micromirror array M.

Based on the information in the information holding element (card C) transmitted from the reader R to the controller and an object detection signal transmitted from the sensor S to the controller, the controller in the display device quickly performs switching between a standby state, in which the individual information (IC tag T) in the card C in proximity to the upper surface of an enclosure of the device is read before the card C is placed thereon and the image I corresponding to this card C is prepared for the display D, and a display state, in which the prepared image I is image-formed through the micromirror array M as the spatial image I' in space over the enclosure. This is a characteristic of the display device according to the present invention.

The display device with the aforementioned configuration uses the information in the information holding element (card C) transmitted from the reader R to the controller and the object detection signal transmitted from the sensor S to the controller to perform operations to be described below. When the card C enters a region in which signals are readable by the reader R (within approximately 10 cm) before the card C comes in abutment with the upper surface of the device, the reader R reads the individual information held by the card C, and the controller is capable of previously preparing the video picture (image I) corresponding to the card C and to be displayed on the display D, based on the individual information transmitted from the reader R to the controller (standby state). When the card C is subsequently brought into abutment with the upper surface of the device, the controller immediately causes the video picture (image I) to be displayed on the display D, based on the object detection signal transmitted from the sensor S to the controller, so that the projected image of this image I is displayed through the micromirror array M and an opening Ca (light-transmissive part) provided in the card C as the spatial image I' over the device (display state).

In this manner, the controller in the display device according to the present embodiment is capable of quickly switching between the standby state in which the individual information in the card C in proximity to the upper surface of the enclosure of the device is read and the image I corresponding to the card C is prepared for the display D and the display state in which the prepared image I is image-formed through the micromirror array M as the spatial image I' in space over the enclosure. In addition, the spatial image I' is displayed based on the detection signal of the object (card C) at the same time that the card C is placed (brought into abutment with the upper surface). This allows a viewer E to feel as if the spatial image I' floated up from the interior (light-transmissive part) of the card C at an appropriate moment. Thus, the display device according to the present invention is capable of displaying the effective spatial image I' corresponding to the information holding element (card C and the like) at an optimum moment with a strong sense of realism as if the spatial image I' existed there.

The components constituting the display device will be described in detail. Examples of the image-forming optical element for use in the display device include refraction type image-forming elements such as various lenses including Fresnel lenses and the like, micromirrors of afocal optical systems, and corner reflectors. Of these, the micromirror array M (corner reflector array) which forms an image at a position symmetrical thereto with respect to the plane of an element surface P, as shown in FIGS. 5 to 9, is preferably used in the present embodiment. The detailed structure of the micromirror array M having a characteristic configuration will be described in detail later. This micromirror array M is disposed substantially horizontally with respect to the eyepoint (sense) of the viewer E by means of a given fixing member and the like.

As shown in FIG. 1, the flat panel display (display D) which displays the image I is disposed so as to be inclined downwardly from the near side (front side) of the viewer E toward the far side at a predetermined inclination angle α with respect to the lower surface Mb of the micromirror array M, so that the spatial image I' projected through the micromirror array M faces toward the viewer E.

Examples of the display D for use in displaying the image I may include display panels capable of reproducing "white" as balanced as possible over all visible wavelengths and "black" when in a non-display state with good contrast, such as plasma display panels and organic EL display panels, in addition to liquid crystal display panels (LCDs) with backlights. The display D may be a display part for a cellular mobile phone, a personal digital assistant or the like. Specifically, normally exposed (uncovered) type display parts for smartphones, tablet PCs, digital photo frames, portable game machines, portable book readers, PDAs, electronic dictionaries and the like in which the dimensions of the display surface Da thereof correspond to the size (planar shape) of the micromirror array M may be used as the display D.

The inclination angle α of the display D is in the range of 30 degrees to less than 90 degrees (30°≤α<90°) in consideration for the attitude, distance and the like of the viewer E that uses this display device.

Figure 2:
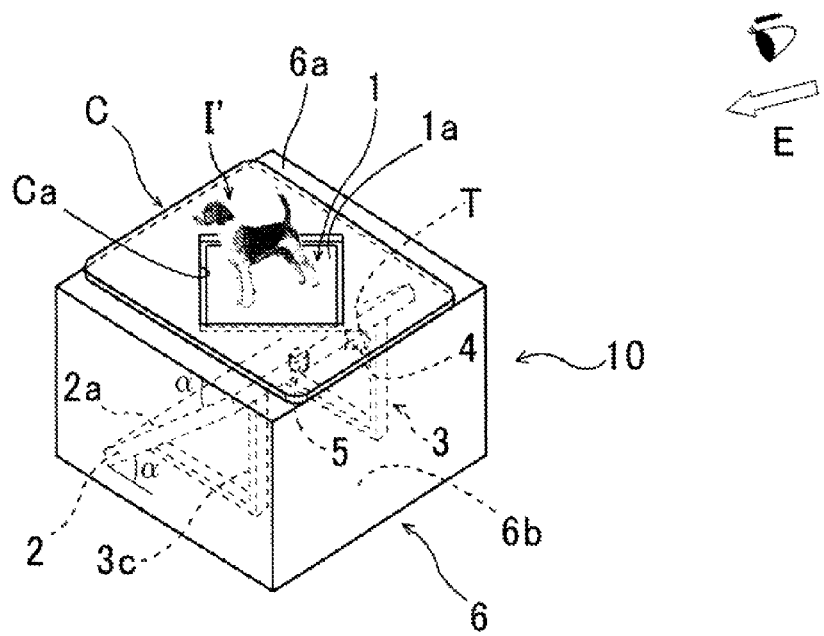
FIG. 2 is an external perspective view of the display device according to a first embodiment of the present invention.
Figure 4:
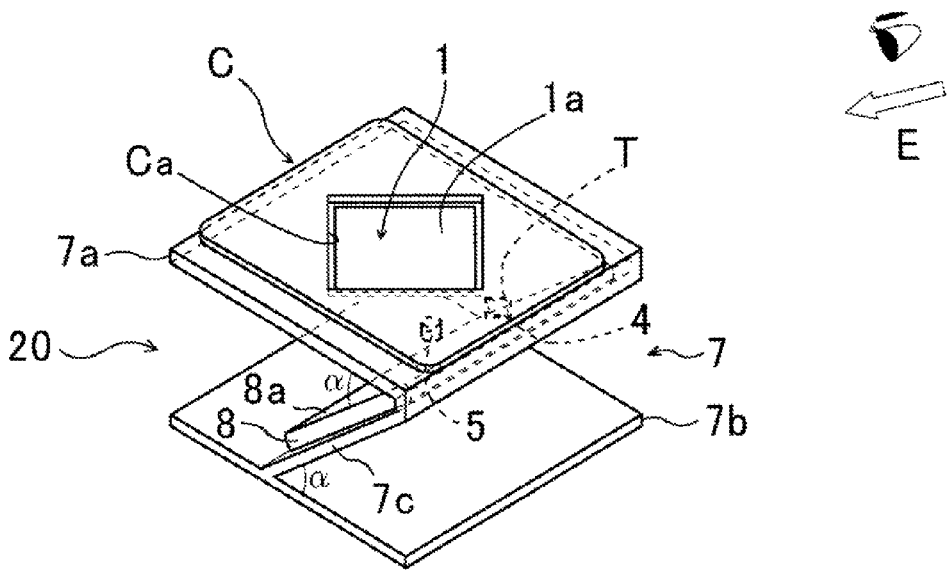
FIG. 4 is an external perspective view of the display device according to a second embodiment of the present invention.

Next, the planar information holding element (card C) to be placed on top of the micromirror array M is planar in shape as a whole, and includes the light-transmissive part (opening Ca) corresponding to the two-dimensional shape of the micromirror array M and provided substantially in the center of the information holding element (card C), as shown in FIGS. 2 and 4. The spatial image I' is image-formed through the opening Ca. The shape of the light-transmissive part (opening Ca) of the card C is close to the shape of the upper surface Ma of the micromirror array M, and is slightly smaller or larger than the shape of the upper surface Ma of the micromirror array M in some cases. Examples of the shape of the light-transmissive part (opening Ca) of the card C may include a circular shape, an elliptic shape and other polygonal shapes such as a hexagonal shape, in addition to a square shape. Further, a transparent plate made of glass, plastic and the like may be fitted in the opening Ca.

The card C used herein may be in the form of a sheet or a thin plate made of paper, plastic and the like. Specific examples of the card C include a card for amusement such as a game, a greeting card, a card for education, a shopping card, a card for authorization, a card for information exchange, a book such as an illustrated book, and an album.

The card C has an IC tag (RFID) T, a printed two-dimensional or one-dimensional bar code and the like disposed at a position (position indicated by the reference character T in FIG. 1) corresponding to the reader R of the display device and serving as the inherent identification information (individual information) for identification of the card C. As mentioned earlier, the corresponding reader R reads the information held by the IC tag T, the bar code and the like. The information is transmitted to the controller of the display D, for example, via wired or wireless communication.

When the IC tag T is used for the card C, an IC tag (RFID) reader and an NCF reader (including a reader/writer) provided with, for example, an HF or UHF band antenna is used as the reader R for reading the identification information. When the bar code is used for the card C, an optical sensor such as a CMOS image sensor (camera) and an optical scanner is used as the reader R for reading the identification information. In the case of the IC tag (RFID) reader and the NCF reader device, a reader device pursuant to the "proximity type" described in ISO/IEC 10536 and capable of steadily communicating (reading data) at a distance of 10 cm or more between the reader and the information holding element (IC tag T) is used for the purpose of reading information before the card C comes in abutment with the upper surface of the device.

Examples of the sensor S used herein for detecting that the information holding element such as the card C is in abutment with the upper surface of the device include various electromagnetic ON-OFF switches such as a pressure-sensitive switch, infrared sensors capable of measuring the distance from the card C, and image sensors. Of these, an infrared sensor simple in structure, stable in operation and capable of clearly finding whether the card C is in abutment (present) or not is preferably used. The sensor S may be installed at any position on the upper surface of the device or on edges of the upper surface of the device where the abutment of the information holding element such as the card C can be sensed. For sensing with reliability, it is desirable that the sensor S is installed at a position near the micromirror array M.

The reader R for reading the information in the card C in a non-contacting manner and the sensor S for sensing the abutment of the information holding element such as the card C with the upper surface of the device are disposed on the upper surface on the viewer E side (near side) in the aforementioned embodiment. The positions at which the reader R and the sensor S are installed are not limited to this. The reader R may be disposed at an appropriate position where the communication with the information holding element such as the card C is enabled, such as in the interior of the device (case), for example. The sensor S may be disposed at an appropriate position where whether the information holding element is present or not is easily sensed, such as around the image-forming optical element and on the edges of the upper surface of the device, in consideration for the shape of the bottom surface of the information holding element for abutment with the upper surface of the device.

In the aforementioned embodiment, the information holding element to be placed on the upper surface of the device is illustrated using a planar or sheet-like element such as a game card as an example. However, three-dimensional objects having individual information including an IC tag, a bar code and the like, such as figures and models, may be used as the information holding element. However, there are cases in which the opening (light-transmissive part) for passage of the spatial image I' therethrough cannot be provided in these three-dimensional objects. Also, it is necessary that the sensor S for sensing whether the information holding element is present or not is disposed in consideration for the shape of the bottom surface of the three-dimensional objects and the placement position thereof. In the case of such a three-dimensional object, three-dimensional parallax is caused between the three-dimensional object and the spatial image I'. Thus, a three-dimensional object makes it easier to adjust the eyepoint (focus) to the spatial image I' than a planar information holding element. A three-dimensional object is therefore more advantageous than a planar information holding element such as the card C in providing improvements in the three-dimensional effect, the sense of floating, the sense of realism and the like.

Next, a more specific embodiment (first embodiment) will be described.

Figure 3:
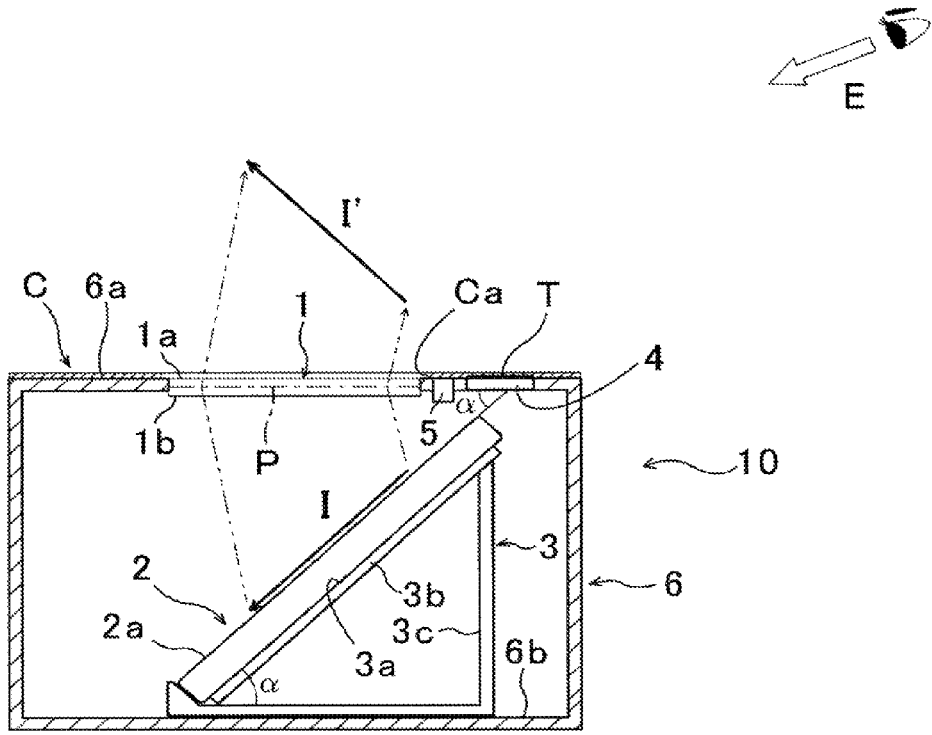
FIG. 3 is a sectional view showing the configuration of the display device according to the first embodiment.

FIG. 2 is an external perspective view of the display device according to the first embodiment of the present invention. FIG. 3 is a partial sectional view showing the configuration of the display device.

A display device 10 according to the first embodiment also includes a panel-shaped micromirror array image-forming optical element (micromirror array 1), and a flat panel display (liquid crystal display 2). By using the reflection of light from a large number of micromirrors (corner reflectors) provided in the micromirror array 1, a video picture (image I) displayed on the liquid crystal display 2 disposed on the lower surface 1b side of the micromirror array 1 is image-formed as a spatial image I' standing up obliquely in space on the upper surface 1a side of the micromirror array 1 in a manner floating up in space. In the display device 10, the liquid crystal display 2 is also placed on a mounting stand 3, with a display surface 2a of the liquid crystal display 2 inclined at a predetermined inclination angle α (in the range of 30 degrees to less than 90 degrees) with respect to the lower surface 1b of the micromirror array 1. A case 6 includes an upper surface (top plate) 6a that is substantially flat so as to allow a planar information holding element such as a card C to be placed thereon.

In the display device 10 as in the display device described in the aforementioned embodiment, an IC tag reader (reader/writer) 4 for reading the individual information (IC tag T) held by the planar information holding element (card C) in a non-contacting manner, and an infrared sensor 5 for sensing whether an object is present on (in abutment with)

the upper surface 6a or not are provided in the upper surface 6a of the case 6 on which the information holding element is to be placed. The liquid crystal display 2 incorporates a controller (not shown) which controls the video picture (image I) displayed on the display surface 2a.

More specifically, the mounting stand 3 including a mounting surface 3a for placing the liquid crystal display 2 thereon includes a plate-like member 3b used also as the mounting surface 3a, and bases 3c. The mounting stand 3 is disposed inside the case 6 of a substantially box-like shape (like a dark box). As shown in FIG. 3, the plate-like member 3b inclined at a predetermined inclination angle α with respect to the bottom surface 6b of the case 6 and the lower surface 1b (or the element surface P) of the micromirror array 1 is supported by the bases 3c. The upper surface of the plate-like member 3b serves as the mounting surface 3a for the liquid crystal display 2. The liquid crystal display 2 is placed on the mounting surface 3a of the mounting stand 3, so that the display surface 2a thereof is held in an attitude inclined at α degrees with respect to the element surface P of the micromirror array 1. It should be noted that the inclination angle α of the mounting surface 3a inside the case 6 with respect to the lower surface 1b (element surface P) of the micromirror array 1 is adjusted so that the micromirror array 1 achieves optimum image formation, and is generally in the range of 30 degrees to less than 90 degrees, and preferably in the range of 40 degrees to 80 degrees.

The enclosure (case 6) for housing the liquid crystal display 2 and the mounting stand 3 has a substantially box-like shape, and includes an opening provided in the upper surface 6a thereof. The micromirror array 1 having a substantially square shape is fitted in the opening provided in the upper surface 6a (with reference to FIG. 2). In FIGS. 2 and 3, the card C similar to that of the aforementioned embodiment is shown as already placed on the upper surface (top plate) 6a of the case 6.

The display device 10 according to the first embodiment is configured to display a three-dimensional spatial image I' floating up over the upper surface 6a, based on the information in the card C transmitted from the IC tag reader 4 to the controller and the object detection signal transmitted from the infrared sensor 5 to the controller, while the viewer E or the like brings the prepared card C close to the device (case 6) and places the card C at a predetermined position on the upper surface 6a.

Specifically, in the display device 10, when the card C enters a region in which signals are readable by the IC tag reader 4 (within a distance of approximately 10 cm from the IC tag reader 4) before the card C comes in abutment with the upper surface 6a of the case 6, the IC tag reader 4 reads the individual information held by the card C, and the controller prepares the image I corresponding to the card C ahead of time, based on the individual information (standby state). When the card C is subsequently placed on (brought into abutment with) the upper surface 6a of the case 6, the controller immediately causes the image I to be displayed on the liquid crystal display 2, based on the object detection signal transmitted from the infrared sensor 5, so that the projected image of this image I is displayed through the micromirror array 1 and the opening Ca (light-transmissive part) provided in the card C as the spatial image I' over the device (display state). The spatial image I' continues to be displayed while the card C is placed on the upper surface 6a of the case 6.

When the use of the card C is thereafter finished and removed from the upper surface 6a of the case 6, the display device 10 immediately stops displaying the image I, based on the interruption of the object detection signal transmitted from the infrared sensor 5, as in the aforementioned embodiment. Then, the IC tag reader 4 repeatedly performs the operation of reading the identification information (standby state loop) while waiting for the next card C or the like coming close thereto (until the next card or the like enters the readable region).

The aforementioned configuration also allows the quick switching between the "standby state" in which the IC tag reader 4 reads the individual information held by the card C before the abutment of the card C with the upper surface 6a of the case 6 and the controller prepares the image I to be displayed on the liquid crystal display 2 ahead of time based on the individual information and the "display state" in which the image I is displayed on the liquid crystal display 2 in timed relation to the abutment of the card C, so that the projected image of the image I is displayed as the spatial image I' over the case 6. Thus, the display device 10 according to the present embodiment is also capable of displaying the effective spatial image I' corresponding to the information holding element (card C and the like) at an optimum moment with a strong sense of realism.

In actuality, there is a slight time lag resulting from a signal transmission path, signal processing and the like between the detection of the information holding element (card C and the like) by means of the infrared sensor 5 and the start of the display of the image I on the liquid crystal display 2. It is hence preferable that the sensitivity of detection of the abutment (contact) by means of the infrared sensor 5 is set to a value slightly greater than a distance of 0 (zero), specifically to a distance of not greater than 5 mm or a distance of not greater than 2 mm, for example. This avoids the influence of the detection time lag.

When a flat panel display in which it takes time to turn on a backlight, such as a liquid crystal panel, is used, a method may be employed in which a solid black image overlaid on the image I (with a liquid crystal shutter closed) is displayed while the backlight of the liquid crystal display 2 previously remains on in the step of previously preparing the image I before the placement of the information holding element, and the overlaid black image is removed (the liquid crystal shutter is opened) in response to the detect ion signal of the infrared sensor 5. This reduces the influence of the turn-on time lag.

Next, a second embodiment will be described in which an open type enclosure (housing 7) is used in place of the aforementioned case 6 of the substantially box-like shape. FIG. 4 is an external perspective view of the display device according to the second embodiment of the present invention. Components having functions similar to those of the first embodiment are designated by the same reference numerals and characters, and will not be described in detail. The IC tag reader 4 and the infrared sensor 5 are connected to a smartphone 8 to be described later via wireless communication such as Bluetooth (registered trademark).

As shown in FIG. 4, the housing 7 used in a display device 20 according to the second embodiment is configured to have no lateral wall surfaces, and has a side surface formed on a bottom plate (sloping surface 7c) used as a mounting surface (mounting surface inclined at the predetermined angle α) for a display (smartphone 8) to be described later. Also, the card C similar to that of the aforementioned embodiment is placed on an upper surface (top plate) 7a of the housing 7.

An adhesive tape or the like for fixing the display (smartphone 8) is affixed to the mounting surface (sloping surface 7c) of the display device 20, and the smartphone 8 temporarily fixed thereon is removable therefrom. Thus, normally exposed (uncovered) type display parts of tablet PCs, digital photo frames, portable game machines, portable book readers, PDAs, electronic dictionaries and the like which are sized to be placeable on the mounting surface (sloping surface 7c) in addition to the smartphone 8 may be used as the display according to the second embodiment. In addition, the housing 7 is advantageous in allowing easy and simple insertion, removal, replacement and the like of the smartphone 8 and the like.

When the smartphone 8, a personal digital assistant and the like are used as the display, some of these devices include an IC tag reader (NFC reader/writer), an optical sensor (CCD camera) and the like that are unique to the devices on the back surface (back surface of a display surface 8a of the display) side. When the smartphone 8 includes the NFC reader/writer, this NFC reader/writer may be used in place of the IC tag reader 4 to read information from the information holding element.

In the case of the smartphone 8 having an optical sensor such as an image sensor and a line scanner on the back surface side of the display surface 8a, a through hole or the like for photographing may be formed in the mounting surface (sloping surface 7c) at a corresponding position, for example. Then, after information such as the bar code in the information holding element is read through the through hole or the like, the card C may be placed on the top plate (upper surface 7a). Alternatively, in the case of the smartphone 8 with an optical sensor disposed on the front surface of the device, the card C may foe inserted under the top plate to read the identification information, and be thereafter placed on the upper surface 7a.

With the aforementioned configuration, the individual information held by the card C (planar information holding element) to be placed on the upper surface 7a of the housing 7 is read by the IC tag reader 4, the NFC reader/writer incorporated in the smartphone 8 and the like, and is transmitted to the controller of the display (smartphone 8), so that the image I corresponding to the card C is previously prepared (standby state). Thereafter, when the card C is placed on (comes in abutment with) the upper surface 7a of the housing 7, the controller immediately causes the image I to be displayed on the liquid crystal display (smartphone 8), based on the object detection signal transmitted from the infrared sensor 5, so that the projected image of the image I is displayed through the micromirror array 1 and the opening Ca (light-transmissive part) provided in the card C as the spatial image I' over the device (display state).

The spatial image I' continues to be displayed while the card C is placed on the upper surface 7a of the housing 7, as in the first embodiment. When the use of the card C is thereafter finished and removed from the upper surface 7a of the housing 7, the display device stops displaying the image I, based on a change in (interruption of) the object detection signal transmitted from the infrared sensor 5. Then, the IC tag reader 4 repeatedly performs the operation (loop) of reading the identification information while waiting for the next card C or the like coming close thereto (until the next card or the like enters the readable region), as in the first embodiment.

Thus, the display device 20 according to the second embodiment also performs switching at an optimum moment between the "standby state" in which the controller prepares the image I to be displayed on the display of the smartphone 8 ahead of time, based on the individual information held by the card C and the "display state" in which the image I is displayed on the display of the smartphone 8 in timed relation to the abutment of the card C, so that the projected image of the image I is displayed as the spatial image I' over the housing 7. Thus, the display device 20 according to the second embodiment is also capable of displaying the effective spatial image I' corresponding to the information holding element (card C and the like) with a strong sense of realism.

Next, characteristic micromirror arrays for use in the display device according to the embodiments of the present invention will be described. FIGS. 5 to 9 are views illustrating the configurations of the micromirror arrays used in the aforementioned embodiments.

Figure 5:
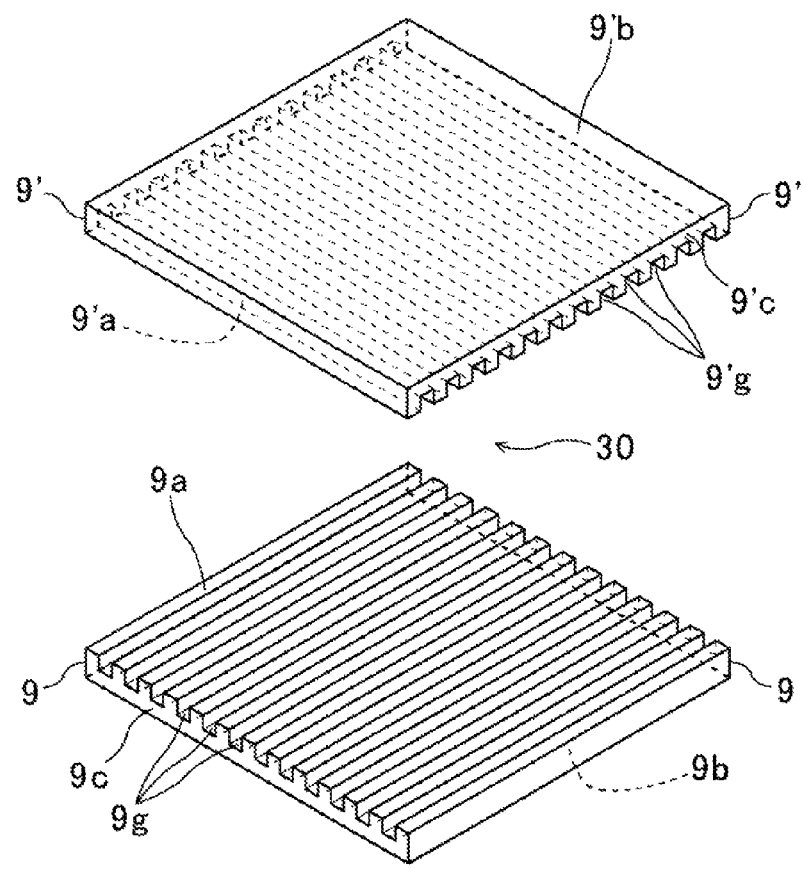
FIG. 5 is a perspective view showing an example of the configuration of a micromirror array for use in the display device according to the present invention.
Figure 6:
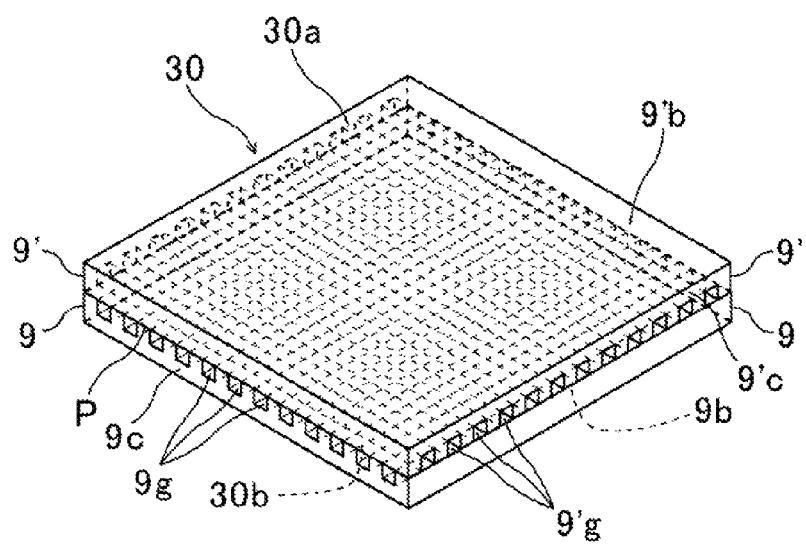
FIG. 6 is a perspective view of the micromirror array.
Figure 7:
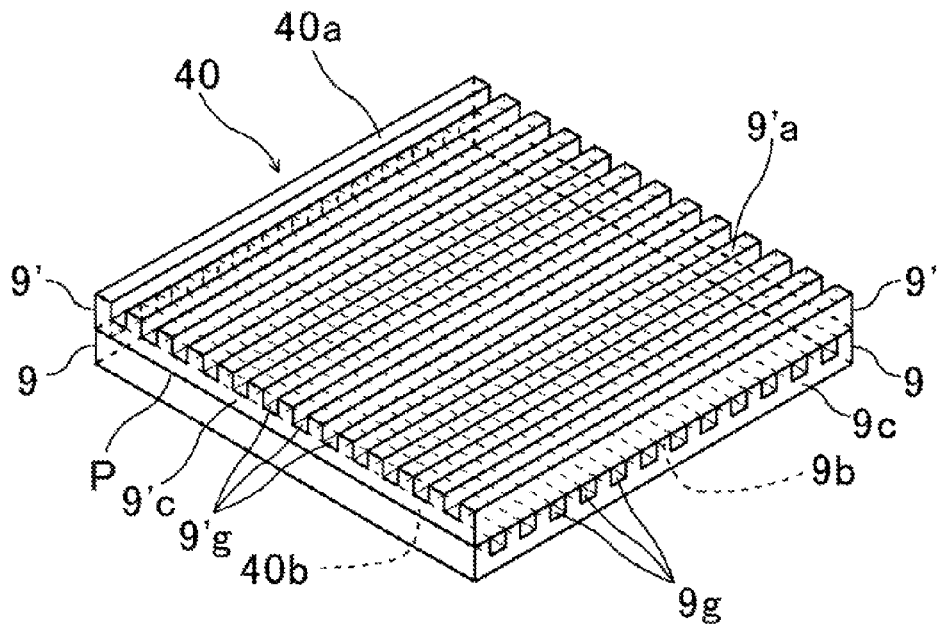
FIG. 7 is a perspective view showing another example of the configuration of the micromirror array for use in the display device according to the present invention.
Figure 8:
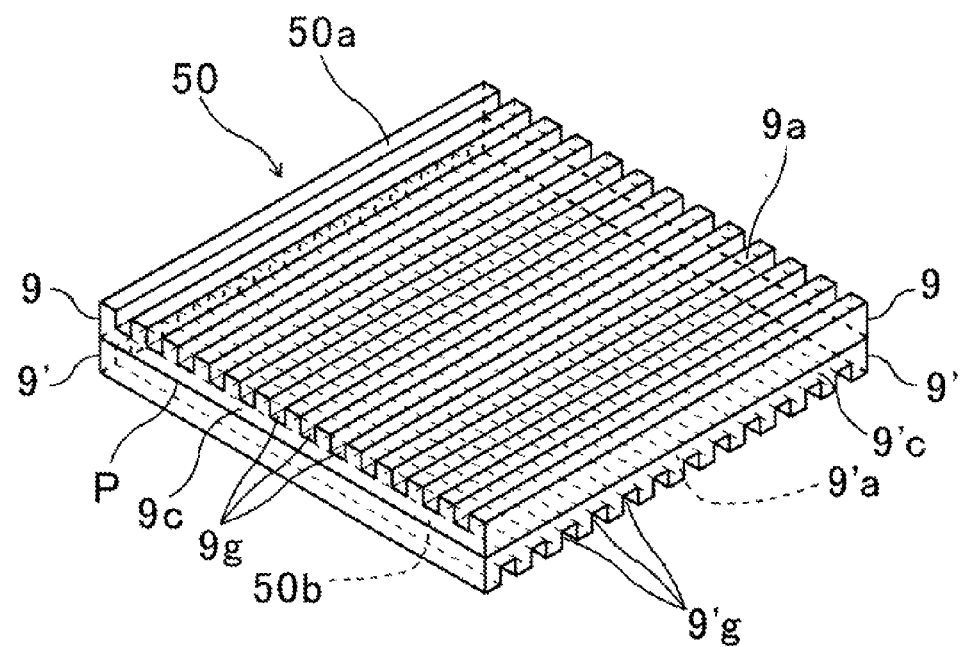
FIG. 8 is a perspective view showing still another example of the configuration of the micromirror array for use in the display device according to the present invention.

Each of the micromirror arrays shown in FIGS. 5 to 8 among those used in the aforementioned embodiments is configured such that two optical elements each having a plurality of parallel linear grooves arranged at predetermined spacings and formed in a first surface of a transparent flat substrate by dicing using a rotary blade are stacked together so that the directions in which the linear grooves of the respective optical elements extend are orthogonal to each other as seen in plan view, to thereby constitute a single unit, the two optical elements being stacked together in a manner selected from the group consisting of:

(X) a manner in which the front surfaces of the respective optical elements where the linear grooves are formed are brought into abutment with each other [with reference to FIGS. 5 and 6];

(Y) a manner in which the front surface of one of the optical elements where the linear grooves are formed and the back surface of the other optical element where the grooves are not formed are brought into abutment with each other [with reference to FIG. 7]; and (Z) a manner in which the back surfaces of the respective optical elements where the grooves are not formed are brought into abutment with each other [with reference to FIG. 8].

Figure 9:
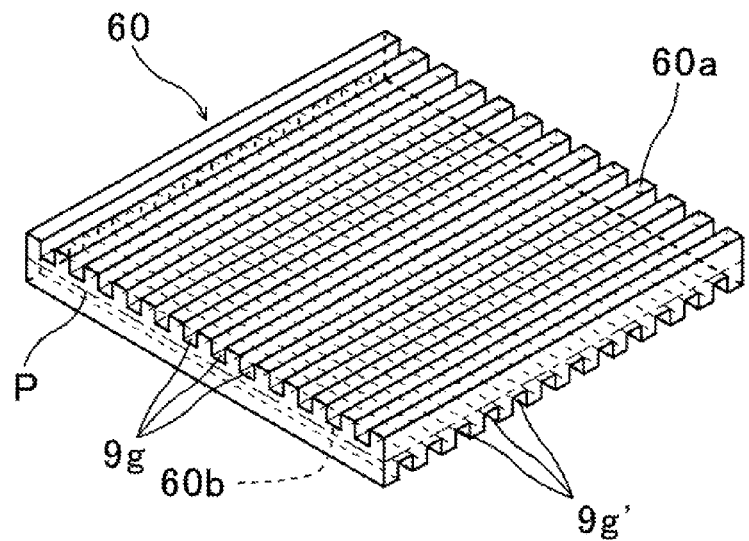
FIG. 9 is a view illustrating the configuration of a modification of the micromirror array for use in the display device according to the present invention.

The micromirror array shown in FIG. 9 is configured such that a plurality of parallel linear grooves arranged at predetermined spacings are formed in a first surface of a transparent flat substrate constituting the optical element and in a second surface thereof opposite from the first surface by dicing using a rotary blade so that the directions in which the linear grooves on the front surface side and the linear grooves on the back surface side extend are orthogonal to each other as seen in plan view.

The structures of the micromirror arrays will be described using a micromirror array 30 in FIG. 6 as an example. The micromirror array 30 shown in FIG. 6 is formed by stacking optical elements (9 and 9') shown in FIG. 5 together. Substrates 9 and 9' (substrates prior to the formation of grooves 9g and 9'g) constituting the respective optical elements are base bodies for engraving of the linear grooves 9g and 9'g, and are made of a material having a visible light transmittance of not less than 80%, such as glass and acrylic resin, for example. These substrates 9 and 9' are generally in the form of hard plates having a fixed thickness (thickness on the order of 0.5 to 10.0 mm). The upper surfaces (front surfaces 9a and 9'a) of the respective substrates 9 and 9' are engraved with the linear grooves 9g and 9'g by dicing. Substrate surface portions which lie between adjacent ones of the linear grooves 9g and 9'g and which are not engraved with the grooves are protruding portions (ridge portions or ridge areas) protruding toward one surface of each of the substrates 9 and 9' by the formation of the adjacent grooves. Flat areas (plate-like portions 9c and 9'c) to which the engraving of the grooves 9g and 9'g does not extend are support bases for the aforementioned ridge portions formed unengraved between the grooves 9g and 9'g.

The grooves 9g and 9'g in the substrates 9 and 9' are formed using a rotary blade (cutting) of a dicing machine and the like, and are spaced at predetermined intervals (spacings) in one direction in surfaces to be machined (front surfaces) of the substrates 9 and 9' so as to be parallel to each other. It should be noted that the side surfaces (wall surfaces) constituting these grooves 9g and 9'g, which are formed by dicing using the aforementioned rotary blade, are formed as light-reflective vertical surfaces (mirror surfaces).

Depending on the thickness of a dicing blade (total thickness between end surfaces of the rotary blade), the grooves 9g and 9'g obtained by engraving using the dicing blade have a groove width of approximately 20 to 350 μm and a groove depth of approximately 50 to 500 μm, when a blade having a thickness of the order of 0.015 mm (15 μm) to 0.3 mm (300 μm) is in general used. The remaining regions (ridge portions) where these grooves 9g and 9'g are not formed are in the form of parallel ribs having a width (W) of approximately 50 to 300 μm and a height of approximately 50 to 500 μm (the same as the depth of the grooves).

With the first substrate 9' rotated 90 degrees horizontally relative to the second substrate 9 (that is, with a phase difference of 90 degrees between the directions of extension of the "grooves" in the lower substrate 9 and the upper substrate 9'), the two substrates 9 and 9' in which the respective linear grooves 9g and 9'g are formed are brought into abutment with each other and stacked together to constitute the single (integral) micromirror array (30, 40 and 50), as shown in FIGS. 6 to 8.

At this time, there is a phase difference of 90 degrees between the directions of the grooves in the lower substrate 9 and the upper substrate 9' as mentioned above. Thus, the continuous directions of the grooves 9g and 9'g of the respective substrates 9 and 9' formed in the same shape are disposed in orthogonal relation to each other as seen in plan view [three-dimensionally in "skew" relation]. When each of the micromirror arrays 30, 40 and 50 is seen in the direction of the front and back of the substrates (vertical direction) in this state, the grooves 9'g of the upper substrate 9' and the grooves 9g of the lower substrate 9 are orthogonal to each other in the form of a lattice as seen in plan view. A corner reflector [a pair of vertically spaced surfaces of a corner reflector] is formed at each of the intersections of the grooves 9'g and the grooves 9g (with reference to JP-A-2014-32394, for example). Such a corner reflector includes a light-reflective vertical surface (second mirror surface) of each of the grooves 9'g of the upper substrate 9' and a light-reflective vertical surface (first mirror surface) of each of the grooves 9g of the lower substrate 9.

The micromirror arrays 30, 40 and 50 shown in FIGS. 6 to 8 are formed in the aforementioned manner. The micromirror array 30 shown in FIG. 6 is formed using the two optical elements (substrates 9 and 9') identical with each other in shape. With the first upper substrate 9' flipped upside down and rotated 90 degrees relative to the second lower substrate 9 (as shown in FIG. 5), the front surface 9'a where the grooves 9'g are formed in the upper substrate 9' is brought into abutment with the front surface 9a where the grooves 9g are formed in the lower substrate 9. These substrates 9 and 9' are stacked one on top of the other so that the directions of extension of the grooves 9g and the grooves 9'g provided in the substrates 9 and 9' are orthogonal to each other as seen in plan view, to constitute the micromirror array 30 [aforementioned manner (X)].

The micromirror array 40 shown in FIG. 7 is formed using the two optical elements (substrates 9 and 9'). With the first upper substrate 9' rotated 90 degrees relative to the second lower substrate 9 so that the continuous directions of extension of the grooves 9g and 9'g provided in the substrates 9 and 9' are orthogonal to each other as seen in plan view, the back surface 9'b (plate-like portion 9'c) where the grooves 9'g are not formed in the upper substrate 9' is brought into abutment with the front surface 9a where the grooves 9g are formed in the lower substrate 9. These substrates 9 and 9' are stacked one on top of the other to constitute the single micromirror array 40 [aforementioned manner (Y)]. A micromirror array having the same configuration is obtained when the substrates 9 and 9' are stacked one on top of the other so that the grooves 9g and 9'g of the substrates 9 and 9' face downwardly as shown in the figure.

Further, the micromirror array 50 shown in FIG. 8 is formed using the two optical elements (substrates 9 and 9'). With the first lower substrate 9' flipped upside down and rotated 90 degrees relative to the second upper substrate 9, the back surface 9b (with reference to FIG. 5) of the upper substrate 9 (the lower surface of the plate-like portion 9c) is brought into abutment with the back surface 9'b (with reference to FIG. 5) of the lower substrate 9' (the upper surface of the plate-like portion 9'c) These substrates 9 and 9' are stacked one on top of the other so that the directions of extension of the grooves 9g and 9'g provided in the substrates 9 and 9' are orthogonal to each other as seen in plan view, to constitute the single micromirror array 50 [aforementioned manner (Z)].

While each of the aforementioned micromirror arrays 30, 40 and 50 is formed using the two substrates 9 and 9' provided with the linear grooves (g) formed in one surface thereof, the micromirror array 60 shown in FIG. 9 is formed using a single substrate (optical element). Specifically, as shown in FIG. 9, the micromirror array 60 is configured such that a plurality of parallel linear grooves 9g and grooves 9g' spaced at predetermined intervals are formed in an upper front surface 60a and a lower back surface 60b, respectively, of the transparent planar substrate by dicing using the aforementioned rotary blade and the like. The grooves 9g on the front surface 60a side and the grooves 9g' on the back surface 60b side are arranged so that the directions (continuous directions) thereof are orthogonal to each other as seen in plan view.

When fitted in the opening provided in the upper surface (6a and 7a) of each of the display devices, each of the micromirror arrays 30, 40, 50 and 60 is disposed, with the whole thereof rotated 45 degrees with respect to the front of the viewer E so that the pair of light-reflective surfaces (first and second mirror surfaces) constituting each corner reflector face toward the eyepoint of the viewer E, as in the first embodiment 5 shown in FIG. 2 and the second embodiment shown in FIG. 4.

In the micromirror arrays 30, 40, 50 and 60, light incident on one surface side (lower surface 30b, 40b, 50b, back surface 60b) of each micromirror array is reflected once from the first mirror surface and once from the second minor surface. Then, the reflected light is transmitted through each micromirror array to the other surface side (upper surface 30b, 40b, 50b, front surface 60b) thereof. Thus, each of the micromirror arrays 30, 40, 50 and 60 for use in the display devices of the embodiments of the present invention is capable of forming the mirror image (spatial image I') of the video picture (image I) displayed on the display disposed on the one surface side of each micromirror array at a spatial position on the other surface side symmetrical to the video picture (image I) with respect to the plane of the element surface P of each microminor array, as shown in FIGS. 1 and 3.

Although specific forms in the present invention have been described in the aforementioned example, the aforementioned example should be considered as merely illustrative and not restrictive. It is contemplated that various modifications evident to those skilled in the art could be made without departing from the scope of the present invention.

The display device according to the present invention is capable of displaying a two-dimensional image that is rich in a sense of depth and appears realistically three-dimensional and that corresponds to the information holding element disposed around the image-forming optical element at an appropriate moment in timed relation to the abutment of the information holding element with the upper surface of the enclosure. Therefore, this display device lends itself to use for game machines, education-related portable devices, lift-the-flap picture books, pop-up picture books and the like in which children and the like are prone to have interests.

REFERENCE SIGNS LIST

1 Micromirror array
1a Upper surface
1b Lower surface
2 Liquid crystal display
2a Display surface
3 Mounting stand
3a Mounting surface
3b Plate-like member
3c Base
4 IC tag reader
5 Infrared sensor
6 Case
6a Upper surface
6b Bottom surface
7 Housing
7a Upper surface
7b Bottom plate
7c Sloping surface
8 Smartphone
8a Display surface
9 and 9' Substrates
9a and 9'a Front surfaces
9b and 9'b Back surfaces
9c and 9'c Plate-like portions
9g, 9'g and 9g' Grooves
10 and 20 Display devices
30, 40, 50 and 60 Micromirror arrays
30a Upper surface
30b Lower surface
40a Upper surface
40b Lower surface
50a Upper surface
50b Lower surface
60a Front surface
60b Back surface
C Card
Ca Opening
D Display
Da Display surface
M Micromirror array
Ma Upper surface
Mb Lower surface
P Element surface
R Reader
S Sensor
T IC tag
I Image
I' Spatial image

The invention claimed is:

1. A display device comprising:
an enclosure for housing a display;
an image-forming optical element provided in light-transmissive fashion in an upper surface of the enclosure;
a display disposed under the image-forming optical element and including a display surface inclined at a predetermined inclination angle with respect to a lower surface of the image-forming optical element;
an information holding element for placement on the upper surface of the enclosure;
a reader for reading information held by the information holding element in a non-contacting manner;
a sensor for sensing whether an object is present the upper surface of the enclosure or not; and
a controller which causes a video picture to he displayed on the display and which controls the video picture, based on signals from the reader and the sensor,
wherein the controller perfonns switching between a standby state (A) and a display state (B), based on the information held by the infoniiation holding element and transmitted from the reader and an object detection signal transmitted from the sensor,
Wherein the standby state (A) is a state in which, when the information holding element enters a region in which signals are readable by the reader before the information holding element comes in abutment with the upper surface of the enclosure, the reader reads individual information held by the information holding element and the controller prepares a video picture corresponding to the information holding element, based on the individual information transmitted from the reader to the controller, and
wherein the display state (B) is a state in which, while the information holding element is in abutment with the upper surface of the enclosure, the controller causes the prepared video picture to be displayed on the display, based on the object detection signal transmitted from the sensor to the controller, so that a projected image of the video picture is image-formed through the image-forming optical element in a manner floating up in space over the enclosure.

2. The display device according to claim 1, wherein the information holding element is planar and includes a light-transmissive part provided in a portion thereof and corresponding to the two-dimensional shape of the image-forming optical element, and wherein the projected image is image-formed through the light-transmissive part.

3. The display device according to claim 1, wherein the inclination angle of the display surface of the display is in the range of 30 degrees to less than 90 degrees with respect to the lower surface of the image-forming optical element.

4. The display device according to claim 2, wherein the inclination angle of the display surface of the display is in the range of 30 degrees to less than 90 degrees with respect to the lower surface of the image-forming optical element.

* * * * *

UNITED STATES PATENT AND TRADEMARK OFFICE
CERTIFICATE OF CORRECTION

PATENT NO.        : 9,706,195 B2
APPLICATION NO.   : 15/120431
DATED             : July 11, 2017
INVENTOR(S)       : Noriyuki Juni It is certified that error appears in the above-identified patent and that said Letters Patent is hereby corrected as shown below:

In the Claims

Column 16 Line 22:
Change:
a sensor for sensing whether an object is "present the" upper
To be:
a sensor for sensing whether an object is --present on the-- upper Column 16 Line 24:
Change:
a controller which causes a video picture to "he" displayed
To be:
a controller which causes a video picture to --be-- displayed Column 16 Line 27:
Change:
wherein the controller "perfonns" switching between a
To be:
wherein the controller --performs-- switching between a Column 16 Line 29:
Change:
based on the information held by the "infoniiation" hold element
To be:
based on the information held by the --information-- hold element Signed and Sealed this
Thirty-first Day of October, 2017

Joseph Matal
*Performing the Functions and Duties of the
Under Secretary of Commerce for Intellectual Property and
Director of the United States Patent and Trademark Office*